(12) United States Patent
Egerer et al.

(10) Patent No.: US 12,343,815 B2
(45) Date of Patent: Jul. 1, 2025

(54) METHOD FOR THE CONTINUOUS PRODUCTION OF OPTICAL FIBRE WAVEGUIDES MOUNTED IN A THIN-WALLED, RADIALLY CLOSED METAL TUBE

(71) Applicant: NEXANS, Courbevoie (FR)

(72) Inventors: Ralf Egerer, Hannover (DE); Olaf Petersen, Hannover (DE); Steven Dinkel, Hannover (DE)

(73) Assignee: NEXANS, Courbevoie (FR)

( * ) Notice: Subject to any disclaimer, the term of this patent is extended or adjusted under 35 U.S.C. 154(b) by 452 days.

(21) Appl. No.: 17/096,161

(22) Filed: Nov. 12, 2020

(65) Prior Publication Data
US 2021/0154768 A1 May 27, 2021

Related U.S. Application Data

(63) Continuation of application No. PCT/IB2019/001284, filed on Nov. 15, 2019.

(51) Int. Cl.
*B23K 26/262* (2014.01)
*B21C 37/08* (2006.01)
(Continued)

(52) U.S. Cl.
CPC ........ *B23K 26/262* (2015.10); *B23K 26/0093* (2013.01); *B23K 26/032* (2013.01);
(Continued)

(58) Field of Classification Search
CPC ........................... B21C 37/0822; G02B 6/4488
See application file for complete search history.

(56) References Cited

U.S. PATENT DOCUMENTS 4,477,147 A * 10/1984 Winter ................. G02B 6/4488
228/151
4,759,487 A * 7/1988 Karlinski ............. B23K 26/262
228/148
(Continued)

FOREIGN PATENT DOCUMENTS

GB 2331160 A * 5/1999 ........... G02B 6/4483
JP H04 350808 12/1992
(Continued)

OTHER PUBLICATIONS

JP-H04350808-A (Kamata Shosei) Dec. 4, 1992 [retrieved on Jan. 25, 2025]. Retrieved from Espacenet Database, translation by EPO and Google. (Year: 1992).*
(Continued)

*Primary Examiner* — John J Norton
*Assistant Examiner* — Franklin Jefferson Wang
(74) *Attorney, Agent, or Firm* — Muncy, Geissler, Olds & Lowe, P.C.

(57) ABSTRACT

For the production of fibre waveguides mounted in a metal hollow profile, a flat metal strip is supplied to a deforming unit. The deforming unit is configured for continuously deforming the supplied flat metal strip into a shape corresponding to the hollow profile. The hollow profile is continuously welded along a longitudinal seam by means of a laser. A filler gel with a viscosity which increases with decreasing temperature, and one or more fibre waveguides, are introduced into the welded hollow profile in a continuous process via a guide or protective tube. In order to introduce the one or more fibre waveguides with an excess length into the hollow profile, the welded hollow profile is elastically stretched, is cooled, and is relaxed again. The finished product is received in a receiving unit. The continuous closed-loop control of the excess length of the fibre waveguides is performed inter alia through continuous open-loop (Continued)

control of the gel temperature, of the laser power and of the force exerted on the hollow profile for the elastic stretching.

18 Claims, 4 Drawing Sheets

(51) Int. Cl.
| | |
|---|---|
| *B23K 26/00* | (2014.01) |
| *B23K 26/03* | (2006.01) |
| *B23K 26/035* | (2014.01) |
| *B23K 26/08* | (2014.01) |
| *B23K 26/20* | (2014.01) |
| *B23K 26/32* | (2014.01) |
| *B23K 31/00* | (2006.01) |
| *B23K 101/06* | (2006.01) |
| *B23K 103/00* | (2006.01) |
| *G02B 6/44* | (2006.01) |

(52) U.S. Cl.
CPC .......... *B23K 26/034* (2013.01); *B23K 26/035* (2015.10); *B23K 26/083* (2013.01); *B23K 26/206* (2013.01); *B23K 26/32* (2013.01); *B23K 31/003* (2013.01); *G02B 6/4488* (2013.01); *B21C 37/0822* (2013.01); *B23K 2101/06* (2018.08); *B23K 2103/50* (2018.08)

(56) References Cited

U.S. PATENT DOCUMENTS

| | | | | | |
|---|---|---|---|---|---|
| 5,143,274 | A | * | 9/1992 | Laupretre | ............ B23K 26/262 228/148 |
| 5,582,748 | A | * | 12/1996 | Yoshie | ................. G02B 6/4484 228/148 |
| 5,857,255 | A | * | 1/1999 | Wichmann | ........... G02B 6/4488 29/17.5 |
| 6,223,407 | B1 | * | 5/2001 | Staschewski | ........ G02B 6/4488 228/148 |
| 2002/0014320 | A1 | * | 2/2002 | Shinkai | .................... B21D 1/05 164/1 |
| 2010/0014818 | A1 | * | 1/2010 | Sales Casals | ........ G02B 6/4484 385/100 |
| 2010/0326967 | A1 | * | 12/2010 | Freitag | ................... B23K 26/28 219/121.64 |
| 2020/0297174 | A1 | * | 9/2020 | Kobayashi | ................ A47L 5/22 |

FOREIGN PATENT DOCUMENTS

| | | | |
|---|---|---|---|
| JP | H04350808 A | * | 12/1992 |
| JP | 2003043320 | | 2/2003 |
| JP | 2003043320 A | * | 2/2003 |

OTHER PUBLICATIONS

International Search Report dated Jul. 14, 2020.

* cited by examiner

METHOD FOR THE CONTINUOUS PRODUCTION OF OPTICAL FIBRE WAVEGUIDES MOUNTED IN A THIN-WALLED, RADIALLY CLOSED METAL TUBE

RELATED APPLICATION

This application claims the benefit of priority from PCT Patent Application No. PCT/IB209/001284, filed on Nov. 15, 2019, the entirety of which is incorporated by reference.

FIELD

The invention relates to the production of optical fibre waveguides with an external casing composed of metal, in particular the continuous production of such fibre waveguides with thin-walled casing.

BACKGROUND

Fibre waveguides for the optical transmission of signals, also referred to as optical waveguides or light conductors, are, depending on the application and requirements on mechanical stability and protection against environmental influences and hydrogen diffusion, encased with a shell composed of plastic or with a metal shell. Fibres in a metal shell are used for example in the case of undersea cables and are commonly also led as a communication channel in earth wires of high-voltage lines. In the latter application, the metal shell is of major importance as a lightning protection means, because, in the event of glass fibre cables being directly struck by lightning, thermal damage to the optical waveguide can occur. The fibre waveguides surrounded with a metal shell are also referred to as Fibre in Metal Tube, or FIMT for short.

Multiple fibres may be laid in one metal tube, for example up to 96 fibres in the case of a diameter of 6 mm. In the case of high-voltage lines led through the open air on masts, an expansion and contraction of the earth cable and of the metal tube occurs as a result of temperature fluctuations, said metal tube, in particular at temperatures between −40 and +100° C., having a higher coefficient of thermal expansion than the fibres laid in the interior of the tube. This constitutes a problem in particular in the presence of high temperatures, because the earth cable and the metal tube become longer, and sag, when warmed. The glass fibre expands to a much lesser extent and is subjected to intense tensile stress, which ultimately leads to breakage of the fibre and thus to an interruption of the communication path led via said fibre.

In order to compensate the different thermal expansion, the diameter of the metal tube may amount to several times the diameter of the fibre, such that the fibre initially lies against a lower wall side of the tube. If the metal tube expands and begins to sag, the fibre in the interior of the tube can move freely until it finally lies against the upper wall side in the event of very great expansion of the metal tube. Only at this point in time is the fibre subjected to a tensile stress which exceeds the tensile stress caused by the fibre's own weight and which can ultimately lead to breakage of the fibre. Such embodiments are however generally not economical and not practicable owing to the large required dimensions of the metal tube.

In order to provide a greater reserve for the compensation of changes in length of the metal tube, the fibre may be received in the metal tube with a greater length than that of the metal tube. During the production process, the uniform distribution of the excess length of the fibre in the tube is difficult to set and monitor.

In the case of a known continuous process for the production of metal tubes with fibre waveguide mounted therein, a fibre waveguide or a bundle of fibre waveguides is supplied to a tube-forming process. In the tube-forming process, a flat strip composed of a metal, for example high-grade steel, is formed into a tube which is slotted in a longitudinal direction and which encases the fibre waveguide or the bundle of fibre waveguides. The flat strip formed into a tube is welded with a longitudinal seam along the slot.

The welding is typically performed by means of arc welding methods such as tungsten inert gas welding (TIG). Wall thicknesses smaller than 0.15 mm however cannot be welded reliably by means of such methods. The tubes welded using the known arc method furthermore exhibit a pronounced weld bead, which projects into the tube interior and exposes fibre waveguides mounted therein to the risk of mechanical damage. Furthermore, tubes with a diameter of less than Ø 4.0 mm cannot be produced using the known method. The dimensioning of the metal tube which encases the fibre waveguide or the bundle of fibre waveguides thus has a lower limit. This leads in turn to a greater minimum bend radius.

The setting of the parameters required for the production of the fibre waveguides or bundles of fibre waveguides mounted in metal tubes is therefore performed in a test run of the manufacturing line. During the test run, firstly, a certain length of the metal tube with a fibre waveguide or bundle of fibre waveguides mounted therein is produced, which is subsequently measured. In particular, it is checked whether the fibre waveguide or the fibre waveguides of the bundle are not interrupted, and whether the excess length of the one or more fibre waveguides corresponds to the specification. The process is repeated with changed parameters of the manufacturing line until the measurements lie in the target range. The test runs may last up to 1 hour, and up to 1 km of material may be required here.

Only when suitable production parameters have been found is the actual manufacturing commenced and the desired length of the fibre waveguide or bundle of fibre waveguides embedded into the metal tube produced. During the production process, there is no possibility to check whether the one or more fibre waveguides is or are, in every section, received in the metal tube with an excess length corresponding to the specification. In particular, the uniform distribution of the excess length over the entire length of the manufactured metal tube cannot be checked. A control measurement after the completion of the manufacturing process can only determine an average excess length in the entire production length, and establish whether the one or more fibre waveguides is or are received in uninterrupted fashion in the metal tube. The distribution of the average excess length cannot be determined, and if the control measurement yields that a defect is present, the entire manufactured product cannot be used.

The conventional production methods may furthermore be limited with regard to the line lengths that can be produced in one piece, which is undesirable in the case of a large required length owing to the necessary connections of successive line segments. Furthermore, the excess length of the fibre is only statistically uniformly distributed; it is in fact not possible with conventional methods to ensure a uniform distribution of the excess length of the fibre, such that a breakage of the fibre cannot be reliably ruled out in the case of an expansion of the metal tube which, statistically on average, is still tolerable.

SUMMARY OF THE INVENTION

It is therefore an object of the present invention to propose an improved method and a corresponding device for the continuous production of fibre waveguides of excess length which are mounted in a metal hollow profile.

Said object is achieved by means of the method according to claim 1 and the device according to claim 10. Refinements and embodiments are specified in each case in the dependent claims.

In this description, the expression "fibre waveguides of excess length" is used with regard to the ratio of the length of the fibre waveguides to the length of the metal hollow profile surrounding said fibre waveguides in each case in the un-stretched, stress-free state, which ratio is, by definition, always greater than 1. Portions of the fibre waveguides situated outside the metal hollow profile are disregarded here.

In the method according to the invention for the continuous production of a thin-walled, radially closed metal hollow profile with fibre waveguides mounted therein, the length of which exceeds the length of the metal hollow profile surrounding them, a flat metal strip is firstly supplied, for example from a coil. The width of the supplied metal strip preferably already corresponds to the circumference of the metal hollow profile. If the supplied metal strip is wider than is required by the circumference of the metal hollow profile, or if the edges of the metal strip are not sufficiently smooth, the metal strip may be trimmed to size at one or two sides in a continuous process during the supply operation. In this description, the expression "metal" is used both for all types of metals, including nonferrous metals, and for the alloys thereof, in particular high-grade steels. The speed with which the metal strip is supplied, or the length that is supplied per unit of time, may be detected continuously.

The metal strip which is present in the suitable width is continuously formed, in a single-stage or multi-stage deformation process, into a hollow profile which has the desired cross section. The deformation process may comprise bending, performed in one or more successive stages, in a longitudinal direction of the strip, for example on correspondingly configured rollers and profiles. Here, the cross section may be circular, oval, in particular upright oval, or of any desired polygonal shape. An upright oval cross section may offer advantages during the closure of the hollow profile and can be easily deformed into a circular hollow profile after the closure.

During the deformation process or following this, one or more individual fibre waveguides or one or more bundles of fibre waveguides, which are to be mounted in the hollow profile, are supplied. The one or more fibre waveguides may be encased with nonmetallic layers. In the case of multiple fibre waveguides being supplied, guide means may be provided which prevent the fibre waveguides from being twisted or being looped around one another. To prevent damage to the fibre waveguide or to the bundle of fibre waveguides as a result of a welding process by means of which the hollow profile is radially closed, the fibre waveguide or the bundle of fibre waveguides is guided within a guide or protective tube which, proceeding from the supply side, as viewed in the drawing-off direction of the hollow profile, projects within the hollow profile as far as beyond the welding point and only thereafter releases the one or more fibre waveguides. The length of the fibre waveguides supplied per unit of time is determined continuously, for example by means of a continuous measurement of the supply speed. Via the guide or protective tube, a filler gel is furthermore introduced into the hollow profile, for example via an annular gap of the guide or protective tube which surrounds the one or more fibre waveguides, which annular gap is offset with respect to the opening which releases the fibres. The filler gel has a lower viscosity at relatively high temperatures than at relatively low temperatures. Inter alia in order to facilitate the introduction of the filler gel, said filler gel may thus be warmed, for example in a reservoir, before being introduced. Fine control of the gel temperature may be performed in a filling hose which connects the reservoir to the guide or protective tube, and/or in a filling head. During the introduction of the filler gel, the throughflow quantity per unit of time is measured and set such that the introduced gel quantity does not take up the entire space within the hollow profile, but rather a free space remains. The free space within the hollow profile is required inter alia if the cross section of the hollow profile is reduced in size again by drawing processes after the closure, in order that the gel does not flow backwards counter to the manufacturing direction.

The hollow profile into which the fibre waveguide or the bundle of fibre waveguides has been introduced has, after the deformation, a region which runs in the longitudinal direction of the hollow profile and in which the edges of the metal strip lie flush against one another. The edges of the hollow profile which lie flush against one another are welded to one another along the abutting edge and are thus radially closed. According to the invention, the welding is performed by means of a laser. Below, the electromagnetic radiation radiated by the laser is referred to by the expression "light", even though the wavelengths of the electromagnetic radiation may lie in wavelength ranges not visible to humans.

The laser introduces light energy into a point in the welding region, which light energy, when it strikes the surface of the material for welding, is absorbed and converted into heat. In order to introduce an adequately high amount of energy into the material for welding, the light must be intensely focused. Intense focusing is therefore also required because the welding is intended to take place only in the region of contact of the edges along the slot. Owing to heat conduction within the metal, regions directly adjacent to the point struck by the laser beam can likewise warm up intensely and possibly melt. Specifically in the case of small cross-sectional dimensions of the hollow profiles to be produced, for example in the case of diameters of smaller than 4 mm, the focusing of the laser beam is therefore of major importance in order to prevent the uncontrolled flow-off of liquefied material, or a breakaway of material. In embodiments of the method according to the invention, the laser beam may have, on the workpiece, a diameter of no more than 20% of the cross-sectional dimensions of the hollow profile, preferably less than 10%. Tests have shown that diameters of the laser beam down to 5% of the cross-sectional dimensions can still make possible weld seams with good quality, wherein, in this case, further measures may be necessary, for example a movement of the focal point over the welding region. In the case of a hollow profile with a diameter of 4 mm, the diameter of the laser beam may preferably amount to less than 10%, that is to say 400 µm, or less, for example down to 200 µm. The expression "cross-sectional dimensions" used in this description may relate to a diameter of a hollow profile, or to edge lengths. Depending on the context, the expression may also relate to bend radii of edges or the like.

The high energy density at the point of which the laser beam strikes the workpiece causes local melting of the material on both sides of the abutting edge, such that the melts flow into one another. The material solidifies again when it is no longer struck by the laser beam, and forms the weld seam. Since the hollow profile in which the fibre waveguide or the fibre waveguides is or are received is led continuously past the static laser, a continuous weld seam is generated which connects the two edges. In order to prevent an uncontrolled flow-off of the liquid material, which is indeed present with a small wall thickness, the introduced laser is power and the speed with which the tube is moved past the laser, must be coordinated with one another. With suitable coordination, smooth weld seams which require no reworking are formed at the outer side and at the inner side.

By contrast to known arc welding in accordance with the tungsten inert gas method (TIG) or metal inert gas method (MIG), which prevent a reaction of the melt with the ambient air by way of the inert gas atmosphere and thus make high levels of seam quality possible, the laser welding used in the case of the invention makes it possible even without shielding gases, owing to the better controllability of the energy input, for metals with material thicknesses smaller than 0.15 mm to be welded to one another in a butt-jointed manner such that no weld bead forms on the inner side of the tube, which is no longer freely accessible owing to the fibre waveguide or the bundle of fibre waveguides mounted therein. In embodiments of the method, the welding point may nevertheless be flowed around or covered by an inert shielding gas, for example argon. The use of a shielding gas atmosphere may be dependent inter alia on the material for welding and the thickness thereof. The shielding gas may, on the inner side of the metal hollow profile, be conducted for example through a further annular gap in the guide or protective tube into the welding region.

The distribution of the input of energy by the laser may be performed either by way of focusing on a relatively large target area, such that available energy acts on a larger or smaller area as required, or by virtue of a particularly tightly focused laser beam being suitably moved back and forth. The focusing on a relatively large target area may also be realized by means of a laser profile which has a central focal point of high intensity and an annular region of relatively low intensity surrounding the central focal point. In this way, the weld region can be heated and cooled in a targeted manner along a temperature profile, which can result in a cleaner weld seam and can targetedly influence the solidified structure. Furthermore, laser beams can be easily pulsed, wherein control of the input of energy is performed for example by way of the pulse duration and the pulse interval.

Welding by means of a laser, in particular heat conduction welding with a power density which does not lead to evaporation of the material for welding, generates a smooth, rounded weld seam which requires no further reworking. In the case of heat conduction welding, the energy spreads only by heat conduction into the workpiece outside the region struck by the laser. In general, the seam width is greater than the seam depth. If the heat cannot dissipate quickly enough, the processing temperature rises above the evaporation temperature, such that metal vapour forms, and the weld depth abruptly increases. The process then changes to deep welding. Here, the weld seam quality is reduced, and the process stability is influenced, such that the risk of welding defects increases. Damage to the guide or protective tube via which the fibres are introduced into the tube may even occur. This can be avoided through corresponding control of the laser power.

The high quality of the weld seam at the outer side and in particular at the inner side of the tube produced according to the invention, which has no pronounced material bead along the weld seam, owing to the finely controllable input of energy into the welding point makes it possible to manufacture metal hollow profiles with thin wall thicknesses and small diameters in a continuous process.

After the welding, the hollow profile is drawn off from the welding region by means of a feed unit, for example by means of a draw-off collet, draw-off cleat or draw-off belt.

After the drawing-off from the welding region, the hollow profile may, by means of one or more further feed units, be led past drawing dies or forming profiles in order to reduce the outer diameter. Here, that space within the hollow profile which has not been filled with the filler gel is reduced in size.

The hollow profile may be cooled by means of a cooling device which is situated downstream of the welding region, preferably upstream of the feed unit. The tube cooling may also be controlled in closed-loop fashion, for example in order to prevent cooling of the hollow profile to below a temperature at which the viscosity of the filler gel exceeds a predefined value.

After the hollow profile has attained its final diameter, it is supplied to a draw-off capstan. The draw-off capstan introduces a tensile force into the hollow profile, which elastically stretches the hollow profile. The tensile force is continuously monitored and can be controlled in closed-loop fashion through corresponding control of the capstan drive. The one or more fibre waveguides embedded in the filler gel within the hollow profile are not stretched by the tensile force. Rather, a corresponding additional length of the one or more fibre waveguides must be supplied such that the one or more fibre waveguides introduced into the hollow profile are substantially free from tensile stresses throughout the entire production process. Owing to the viscosity of the filler gel which is still low owing to the temperature, it is also the case during the elastic stretching that no significant transmission of force occurs between the inner side of the elastically expanded hollow profile and the fibre waveguide or the fibre waveguides. The elastically stretched hollow profile is, in the stretched state, led multiple times around the draw-off capstan, such that the hollow profile and the filler gel introduced therein can cool further, in particular to a temperature at which the viscosity of the filler gel has greatly increased. Downstream of the draw-off capstan, there may be arranged a further feed unit, for example a draw-off belt, which holds the hollow profile on the capstan. The further feed unit leads the hollow profile from the draw-off capstan to a winder in a manner substantially free from tensile stresses. Here, "substantially free from tensile stresses" is to be understood to mean that the hollow profile is subjected to no or only negligible stretching. The length of the hollow profile that is led away from the draw-off capstan per unit of time is continuously determined, for example through continuous detection of the speed.

Owing to the elimination of the tensile stress downstream of the draw-off capstan, the hollow profile elastically contracts again. The gel introduced in liquid form at elevated temperature has become more solid as a result of the cooling, and functions as a type of friction force promoter between fibre waveguide and the inner side of the hollow profile, which friction force promoter transmits the movement of the contracting hollow profile to the one or more fibre waveguides. Because the cooled gel does not permit a completely free movement of the fibres in the hollow profile, in particular does not permit a simple longitudinal displacement, the one or more fibre waveguides which lie in a substantially stress-free state in the metal tube at all times during the production process, and which are too long for the hollow profile which is relatively short in the stress-free, unstretched state, is or are "compressed", as it were, on average over the entire length of the hollow profile. The fibre is in this case not actually compressed but is rather displaced out of its longitudinal axis in buckled fashion in the interior of the hollow profile.

During the production process, the length of the hollow profile that is led away from the draw-off capstan per unit of time and the length of the fibre waveguide or of the fibre waveguides supplied per unit of time are continuously determined and averaged over a set period of time in order to compensate closed-loop control fluctuations of the drive control. Suitable time periods may lie in the range of minutes, wherein a longer duration on the one hand leads to more accurate results but on the other hand correspondingly lengthens the time until a closed-loop control intervention that may be required. From the averaged measured values, an excess length of the one or more fibre waveguides in the hollow profile manufactured during the time period is determined. In order to be able to dynamically correct deviations from a setpoint value, in addition to the detection of the length of the one or more fibre waveguides supplied per unit of time and of the length of the hollow profile that is led away from the draw-off capstan per unit of time, at least one controlled variable from the non-exhaustive first list comprising supply speed of the metal strip or length of the metal strip supplied per unit of time, power of the laser, temperature of the filler gel, throughflow quantity of the filler gel per unit of time, speed of the drawing-off of the hollow profile from the welding region, tensile force exerted on the hollow profile and temperature of the hollow profile upstream of the draw-off capstan is continuously recorded. From the at least one controlled variable, at least one manipulated variable for the open-loop control of the power of the laser, for the closed-loop control of the heater of the reservoir, of the filling head and/or of the cooling device and/or for the open-loop control of a drive of one or more feed units and/or of the draw-off capstan is detected.

In one or more embodiments of the method, the width of the supplied metal strip is measured and a cutting width is updated in a manner dependent on the measurement result and a specification value. The width corresponds approximately to the circumference of the hollow profile, which surrounds the fibre waveguide or the bundle of fibre waveguides, along the neutral fibre. Here, the specification value can be varied and a deformation device can be correspondingly controlled in a manner dependent on the varying width of the metal strip, for example in order to adapt the material quantity required for a clean weld seam.

In one or more embodiments of the method, a temperature profile transversely with respect to the weld seam is measured. The measured temperature profile may be used to control the energy that is input into the welding point. The measured temperature profile may for example be compared with a specification profile, and the control of the energy that is input may comprise a variation of the focal diameter, of a path described by the focal point on the material for welding, and/or a variation of the pulse duration and/or of the pulse interval of the laser beam. It is likewise conceivable for the supply speed of the metal strip to be controlled in closed-loop fashion in a manner dependent on the measured temperature profile. The measured temperature profile may also be stored for the purposes of quality management and documentation.

In one or more embodiments of the method, for this purpose, the length of the metal strip supplied per unit of time is continuously measured. From the ratio of the length of the welded and reduced hollow profile that is led away per unit of time and the length of the metal strip that is supplied within the same time, it is possible to detect material deviations of the metal strip, for example different yield strengths, which can be directly taken into consideration in the closed-loop control of the production process.

In one or more embodiments of the method, the weld seam is inspected by means of ultrasound, x-rays, an eddy current measurement or other nondestructive measuring methods. The results of the inspection may for example be used for the control of the energy input into the welding point and/or of the supply speed.

A device according to the invention for the continuous production of a thin-walled, radially closed metal hollow profile with at least one fibre waveguide is mounted therein comprises a supply unit configured for supplying a flat strip of the metal. The supply device may for example comprise a holder for a flat metal strip wound on a reel or a coil. The metal strip is unwound from the reel or the coil and supplied to a deforming tool which deforms the flat metal strip to form the hollow profile such that the opposite edges of the flat metal strip abut flush against one another in a butt-jointed manner. The deforming unit may for example have multiple rollers and profiles, for example drawing dies, which deform the metal strip, as it passes through in the longitudinal direction, to form the desired hollow profile. The deforming unit may furthermore have two or more guide means which are spaced apart from one another in the longitudinal direction of the deformed metal strip or hollow profile and between which the edges are held so as to lie flush against one another at least at a point that is to be welded. If necessary, the strip may be guided laterally at one or more points upstream of and in the tool in order to minimize lateral movement of the strip.

The device furthermore comprises a welding device which welds together the edges lying flush against one another between the guide means. The welding device comprises a laser which radiates light with energy which causes local melting of the metal to both sides of the edges.

As a result of the continuous drawing-off of the deformed and welded hollow profile, regions in which the material has melted pass out of the region in which the laser heats the material, and the molten material solidifies again. The energy input into the material for the purposes of heating the latter is coordinated with the material, the thickness thereof and the speed with which the hollow profile is led past the welding point, such that, although the material in a region situated directly at the edges that lie flush against one another is melted, no liquid material runs into the interior of the hollow profile. By way of the guide means, the spacing between an optical system of the laser and the edges of the hollow profile that are to be welded can be kept constant. In order to keep the position of the edges abutting against one another constant in relation to the optical system of the laser, it is possible, upstream of the guide means which close the longitudinal slot, for a so-called blade to be arranged in the longitudinal slot that lies between the edges, in order to prevent twisting into a spiral shape.

The device furthermore comprises a supply device configured for supplying at least one fibre waveguide. The one or more fibre waveguides are for example unwound from one or more fibre unwinders and introduced into the welded hollow profile via a guide or protective pipe which projects from an entrance side into the hollow profile and which ends only after the welding point. If multiple fibre waveguides are supplied, the supply device may have a fibre guide by means of which the fibre waveguides are guided separately and twisting or intertwining of the fibres is prevented. Alternatively or in addition, the supply device may have one or more so-called fibre binders which connect multiple fibres to form a bundle and wrap them with a thread. The supply device furthermore has a measuring device for the continuous, preferably contactless, measurement of the length of the one or more fibre waveguides supplied per unit of time.

The device furthermore comprises a gel filling unit which introduces a filler gel, which has a viscosity which decreases with increasing temperature, into the hollow profile in which the one or more fibre waveguides are mounted. The filler gel may likewise be introduced into the hollow profile via the guide or protective tube or via a tube which is guided therein. In one embodiment, between the guide or protective tube and the tube which conducts the filler gel, there is formed an annular gap which is situated downstream of the welding point. The gel filling unit may have a reservoir and be configured to introduce the filler gel into the hollow profile at a temperature at which the viscosity of the filler gel does not exceed a predetermined value. For this purpose, the reservoir, a filling hose connected thereto and/or a filling head connected thereto may be heatable, in particular in a manner controlled by a closed-loop temperature control unit. The gel filling unit is furthermore configured to continuously detect the volume of the filler gel that is introduced into the hollow profile per unit of time.

The device furthermore comprises one or more feed units which draw off the welded hollow profile from the welding region and convey said hollow profile onwards. The one or more feed units may for example comprise one or more draw-off collets, draw-off cleats or draw-off belts of known construction, wherein it is also possible for different feed units to be combined. Upstream of the feed unit, there may be arranged a cooling arrangement which cools the hollow profile, which has been heated as a result of the welding, down to a temperature at which an adhesion to downstream tools is prevented in an effective manner, and the tools leave no imprints in the hollow profile.

The device furthermore comprises a draw-off capstan which is arranged downstream of the feed unit and by means of which a tensile force is exerted on the welded metal hollow profile, which tensile force elastically stretches the metal hollow profile. The elastically stretched metal hollow profile is in this case led multiple times around the draw-off capstan. The tensile force provided by the draw-off capstan may be continuously monitored by means of a force measuring device and adjusted by closed-loop control to a setpoint value. Alternatively, the draw-off capstan may be driven with a constant speed which is slightly higher than the speed of the preceding drive, and thus effects elastic stretching of the hollow profile. The metal hollow profile is led away from the draw-off capstan in a substantially stress-free state, such that the elastic stretching has been eliminated.

The device furthermore comprises a measuring device which is arranged downstream of the draw-off capstan and which serves for the preferably contactless determination of the length of the metal hollow profile led away from the draw-off capstan per unit of time and supplied to a winder.

Following the draw-off capstan, there may be arranged a further feed unit which holds the metal hollow profile on the draw-off capstan without causing significant elastic stretching of the hollow profile. The measuring device for determining the length of the metal hollow profile led away from the draw-off capstan per unit of time and supplied to a winder may be arranged between the draw-off capstan and the further feed unit or downstream of the feed unit.

In one or more embodiments of the device, a measuring device for ascertaining the tensile force is provided upstream of the deforming unit. The ascertained tensile force may be fed as an actual value to a closed-loop control means and used, together with a setpoint value, for the closed-loop control of the drives of the device, for example for the closed-loop control of the speed of the supply of the metal strip.

In one or more embodiments, the device furthermore comprises a cutting unit which is arranged upstream of the deforming unit and by means of which one or both edges of the supplied flat metal strip are trimmed, wherein the width of the trimmed metal strip approximately corresponds to the circumference of the neutral fibre of the hollow profile. In the case of these embodiments, it is possible without great outlay to produce metal hollow profiles with different circumferences by virtue of the supplied metal strip being cut to the required width and the further tools of the device being adapted.

In one or more embodiments of the device equipped with a cutting unit, a measuring device for measuring the width of the cut-to-size metal strip is provided downstream of the cutting unit. On the basis of the measured values, the cutting unit can be controlled in order to maintain a desired width of the metal strip over a long period of time. The cutting unit may be supplied with corresponding specification values with which the measured width of the metal strip are compared in order to generate a control signal for the setting of the cutting unit.

Parts which have been cut off at one or both edges of the strip may, in one or more embodiments, be supplied to a device provided for receiving cutting residues.

In one or more embodiments, the device furthermore comprises a measuring device for determining a temperature profile transversely and/or longitudinally with respect to the weld seam. The measured temperature profile may be supplied to the welding device for the open-loop control of the output energy, to the supply unit, to the feed unit for the open-loop control of the supply speed and/or the temperature open-loop control for the filler gel.

In one or more embodiments, the device is furthermore configured to cover the weld point at the inside and/or the outside with a shielding gas. On the inside, the shielding gas may be introduced for example through a tube which is led in the guide or protective tube and which forms an annular gap with the latter at the weld point, or in a separate protective tube. On the outside, the shielding gas may be supplied at the welding point or in the vicinity thereof. In order to attain a longer coverage with the shielding gas, the welded hollow profile may be led through a tube portion which is flooded with the shielding gas.

In one or more embodiments, the device furthermore comprises a measuring device for measuring at least one dimension of the hollow profile after the welding. Said measuring device may be used for integrated quality control, in the same way as a measuring device, provided in one or more embodiments, for inspecting the weld seam and/or material defects or inhomogeneities of the material. The dimensions may preferably be measured in contactless fashion, for example by means of laser.

With the above-described method and the device in the case of which laser light is used for the welding of thin-walled metal sheets, it is possible in a simple manner for hollow profiles with wall thicknesses down to below 0.3 mm and diameters or dimensions of smaller than 10 mm to be produced at a high level of quality without laborious reworking, into which hollow profiles one or more fibre waveguides can be introduced in the same working step. Through the use of suitable focal diameters of the laser beam, a zone of heat influence which is sufficiently small in relation to the dimensions of the hollow profile such that no material cracks occur, and a weld seam is generated which has no pronounced bead on the tube inner side, is ensured in the continuous welding process.

The smaller wall thickness of the hollow profile with the fibre waveguides embedded therein can contribute to the saving of metal and thus to the conserving of valuable resources. A reduction of the wall thickness can furthermore reduce the laser power required for the welding, which in turn results in energy savings or alternatively an increase in processing speed with the same laser power can be made possible.

With regard to the finished product, a thinner wall thickness of the hollow profile may likewise prove advantageous, but this leads to a lower weight per unit of length, which can facilitate transport and installation.

The continuous measurement of the excess length in accordance with the method according to the invention makes it possible already during the ongoing production process for process parameters such as for example temperature and quantity of the filler gel introduced per unit of time, the tensile force acting on the hollow profile and thus the elastic stretching, the fibre supply speed and the supply speed of the metal strip deformed to form the hollow profile to be dynamically adapted in order to attain a uniformly distributed excess length of the fibre waveguides. Here, it is also possible for deviations with regard to the material of the metal strip to be detected, for example deviating elastic yield strengths, such that a corresponding adaptation of the tensile force during the elastic stretching of the welded hollow profile or during the drawing for the purposes of decreasing the dimensions can be performed during the ongoing process.

BRIEF DESCRIPTION OF THE DRAWING

The invention will be discussed in more detail below on the basis of an embodiment and with reference to the accompanying figures in exemplary fashion. All of the figures are purely schematic and not to scale. In the figures.

Identical or similar elements are denoted by the same or similar reference designations in the figures.

DETAILED DESCRIPTION

Figure 1:
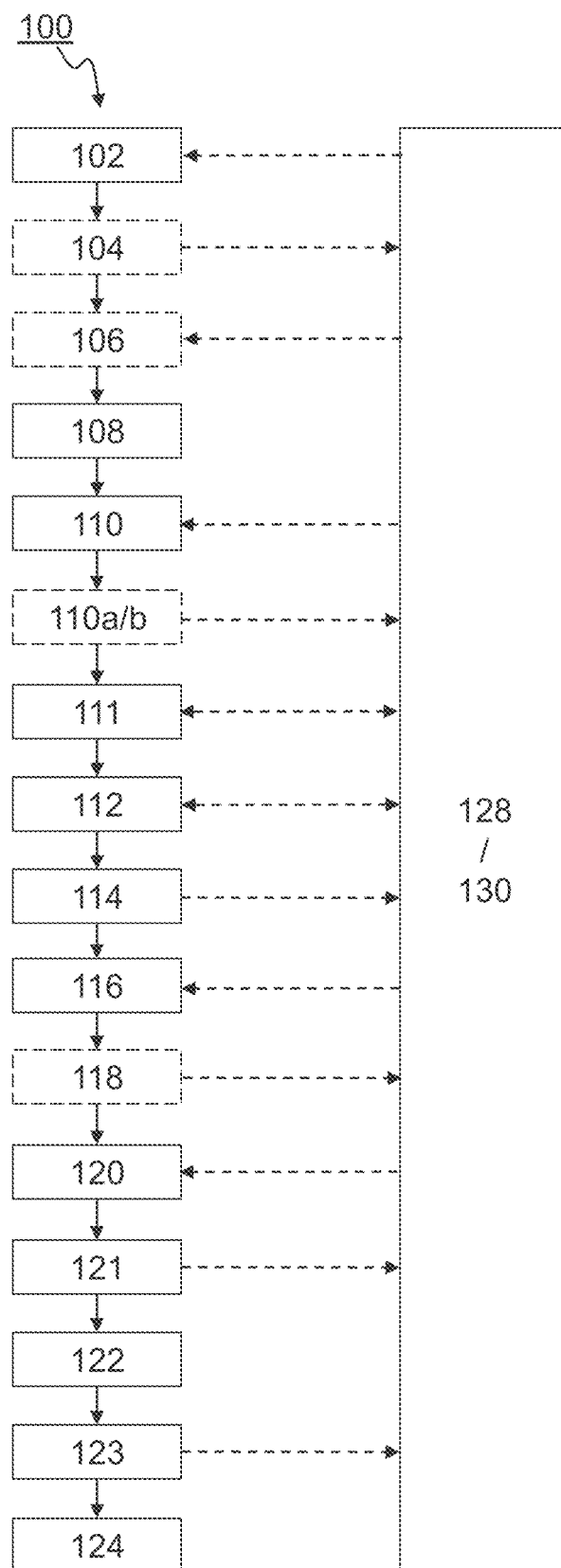
FIG. 1 shows an example of the method according to the invention for the continuous production of thin-walled, radially closed hollow profiles.

FIG. 1 shows steps of an exemplary method 100 for producing a thin-walled, radially closed metal hollow profile, with fibre waveguides of excess length mounted therein, according to one aspect of the invention. In step 102 of the method, a flat metal strip is supplied with a first supply speed to a deforming unit, for example is unwound from a coil. In the deforming unit, the supplied flat metal strip is, in step 108, deformed to form a shape corresponding to the desired hollow profile. The deformation may be performed for example by means of a roll forming tool.

Prior to the deformation, in a cutting unit, an optional step 106 may be performed in which one or both edges of the metal strip are trimmed or prepared in some other way. In this way, even in the case of poor edge quality of the metal strip, the width of the strip can be uniformly and precisely set, and the edges can if necessary be prepared for a subsequent welding process. The cutting unit may be supplied with measured values from a measuring device which detects the width of the metal strip after the trimming process. The cutting residues may be received in a corresponding receiving device.

During the deformation, the edges of the metal strip are guided by means of guide elements such that a twisting prior to the welding is prevented, and the edges lying flush against one another are led in a defined position and with a defined spacing past a welding device. The guide elements may for example comprise one or more fin-type washers or guide blades and one or more guide bushings which are adapted to the geometry of the hollow profile and which are adapted to the hollow geometry to be manufactured. The closing of the geometry may be performed for example by means of drawing dies, closing rings or side-roller stages.

After the deformation, two opposite edges of the flat strip lie flush against one another in a contact region. In step 110, the edges which lie flush against one another in the contact region are welded to one another in continuous fashion. The welding is performed by means of a laser. If necessary, the weld seam may be covered by means of shielding gas in a manner adapted to the required weld seam quality.

In step 111, one or more fibre waveguides from one or more fibre unwinders, and a filler gel, are introduced into the welded hollow profile, which filler gel has a viscosity which increases with decreasing temperature. The filler gel and the one or more fibre waveguides may be led through under the welding region for example by means of a protective or guide tube, such that filler gel and fibre waveguides emerge from the protective or guide tube only in the already-welded hollow profile. The length of the one or more fibre waveguides supplied per unit of time, and the introduced quantity of filler gel, is likewise determined in continuous fashion in step 111. In step 112, the welded hollow profile with the one or more fibre waveguides mounted therein is drawn off from the welding region. Here, in step 116, after the welding, the filler gel and the hollow profile may be temperature-controlled such that the viscosity of the filler gel does not exceed a predetermined value. Before this, in step 114, the temperature may be measured. In step 120, the hollow profile is elastically stretched by a force exerted by means of a draw-off capstan. The tensile force is monitored in step 121. The elastically stretched hollow profile is then cooled in the stretched state, step 122, such that the viscosity of the filler gel increases, before said hollow profile is, in step 124, after the elastic stretching has been withdrawn or dissipated, supplied to a receiving device in order to be received. Here, in step 123, the received length of the hollow profile is determined in continuous fashion. The recording 128 of controlled variables at different points of the method, and the corresponding determination 130 of manipulated variables for drives and actuators of the device 200, are indicated in the figure by the dashed arrows.

For the monitoring of the quality of the weld seam, it is possible in an optional step 110a for the temperature profile transversely and/or longitudinally with respect to the weld seam to be determined. The ascertained temperature profile may be supplied to a controller of the laser and to other elements of a device which implements the method, in particular also to one or more drives which perform closed-loop control of the supply speed of the metal strip or of the speed with which the welded hollow profile is drawn off from the welding region.

The method may optionally also comprise an ascertainment of the tensile force on the strip prior to the deformation in step 104. The ascertained tensile force may likewise be supplied to one or more drives as a measurement variable for the closed-loop control.

The method may furthermore comprise an optional step 110b in which one or more dimensions of the welded hollow profile are determined. The ascertained dimensions may be supplied in particular as input variables for the closed-loop control of the deformation process and of the cutting process for the setting of the width of the strip.

The method may also, after the welding, comprise an optional step 118 in which the quality of the weld seam and/or the material for welding are inspected for material defects in non-destructive fashion, for example by means of eddy current inspection, ultrasound or x-rays.

Not illustrated in FIG. 1 are subsequent processes by means of which the hollow profile is cut into pieces, or an encasing of the hollow profile with an insulating or protective layer is performed.

Figure 2:
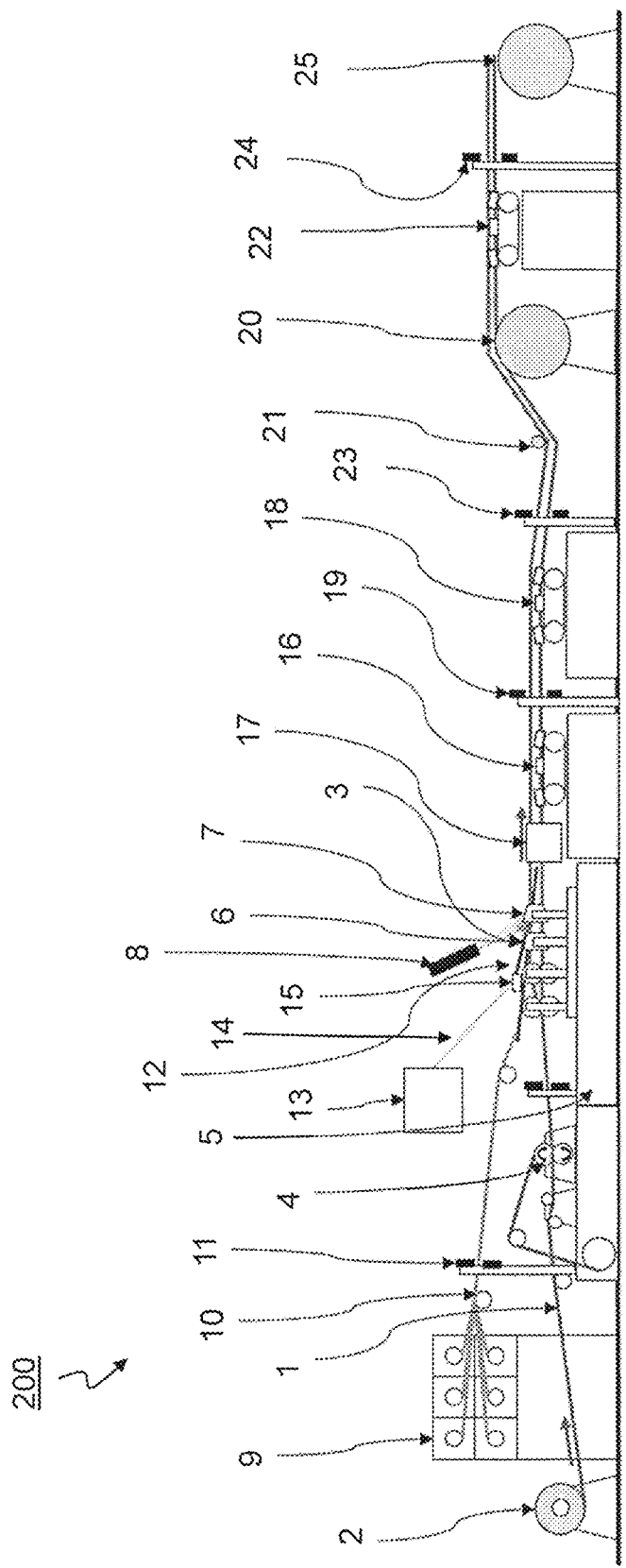
FIG. 2 shows an example of a device according to the invention for the continuous production of thin-walled, radially closed hollow profiles.

FIG. 2 shows an example of a device 200 according to the invention for the continuous production of thin-walled, radially closed metal hollow profiles with one or more fibre waveguides mounted therein. From a reel or unwinder 2, a thin metal strip 1, for example a strip composed of high-grade steel, is unwound. The metal strip 1 is supplied to a roll forming tool 3, 7, by means of which said metal strip is brought into the shape of the desired hollow profile, for example is shaped to form a longitudinally slotted round tube. Between the reel or unwinder 2 and the roll forming tool 3, 7, there may be provided a cutting unit 4 which cuts the metal strip 1 to a required width or cuts one or both edges of the metal strip 1 in order to obtain clean and smooth edges. A receiving device may be provided for receiving cut-off parts of the metal strip 1. The width of the cut-to-size metal strip 1 may be inspected in a strip width measuring device. The measurement results may be supplied to the cutting unit 4 for the purposes of closed-loop control. Furthermore, between the reel or unwinder 2 and the roll-forming tool 3, 7, there may be arranged a measuring device for ascertaining the tensile force, the measured values of which can be used for example for the closed-loop control of drives of the device 200. A measuring device 5 is provided which monitors the strip speed and/or length of the supplied metal strip. Before the closing of the metal hollow profile, one or more fibre waveguides are supplied by a supply device 9, and a filler gel is supplied by a gel filling unit 13, in which filler gel the one or more fibre waveguides received in the hollow profile are mounted. The filler gel may be supplied via a filling hose 14 to a filling head 15, which is connected to a guide or protective tube through which the one or more fibre waveguides are also introduced into the metal hollow profile. The length of the fibre waveguides supplied per unit of time is monitored in a first measuring device 11. The gel filling unit may be configured for detecting the supplied quantity of filler gel, for example by means of a throughflow meter. Those edges of the strip which lie against one another after the forming of the hollow profile may, by means of one or more guide elements 6, be led in front of a laser welding device 8 such that twisting of the hollow profile prior to the welding is prevented, and the spacing with which it passes through below an optical system of the laser welding device 8 is maintained. The guide elements 6 may comprise one or more fin-type washers or guide blades and one or more guide bushings adapted to the hollow profile which forms the outer conductor. The geometry of the hollow profile for welding is closed by means of drawing dies, closing rings, side-roller stages or guide bushings 7, such that the edges of the metal strip 1 that has been deformed to form the hollow profile lie against one another in the region of the laser welding device 8. The welding region may be covered with a shielding gas, for example argon, by means of a shielding-gas device which is not illustrated in the figure, in order to prevent reactions of the material for welding with the atmosphere. The feed of the welded hollow profile is performed by means of a feed unit 16. The feed unit 16 may for example comprise one or more draw-off collets, draw-off cleats or draw-off belts, or combinations of these. The hollow profile drawn off from the welding region is cooled by means of a cooling device 17 to a temperature at which the viscosity of the filler gel does not exceed a predefined value. The figure also illustrates a further feed unit 18 and drawing die mounts 19, by means of which the dimensions of the metal hollow profile are reduced. Subsequently, by means of a draw-off capstan 20, a tensile force is exerted on the hollow profile, which tensile force causes elastic stretching. The hollow profile is led multiple times around the draw-off capstan 20, wherein the temperature decreases further, and the viscosity of the filler gel increases. Prior to the introduction of the tensile force, the temperature of the metal hollow profile is ascertained in contactless fashion by a temperature measuring device, which temperature is supplied as a controlled variable to the cooling device 17. Further temperature measurement means may be arranged, in the manufacturing direction, downstream of the welding region, downstream of the cooling device 17, downstream of the drawing dies 19 and 23 and/or downstream of a further feed unit 22, which holds the hollow profile on the draw-off capstan. From the draw-off capstan 20, the hollow profile is supplied in a manner substantially free from longitudinal stresses to a winder 25. Here, the length of the product that is received per unit of time is determined in contactless fashion by means of a second measuring device 24. As a result of the elimination of the longitudinal stress, the elastic stretching is eliminated, and the one or more fibre waveguides are compressed into a buckled form by the filler gel, owing to the now higher viscosity, during the contraction of the hollow profile, such that, in relation to the length of the hollow profile received by the winder, a greater length of the one or more fibre waveguides is received. A control unit which is not illustrated in the figure continuously ascertains a present excess length of the fibre waveguides from the difference between the length measurements of the first and second measuring devices 11 and 24. Furthermore, present process parameters or reference variables such as for example supply speed of the metal strip, laser power, gel temperature, gel throughflow, feed speed, tensile force and tube external temperature are recorded, and from these, actuation values for the laser power, gel temperature, feed speed, cooling power and/or tensile force are determined for the automatic closed-loop control of the excess length.

Figure 3:
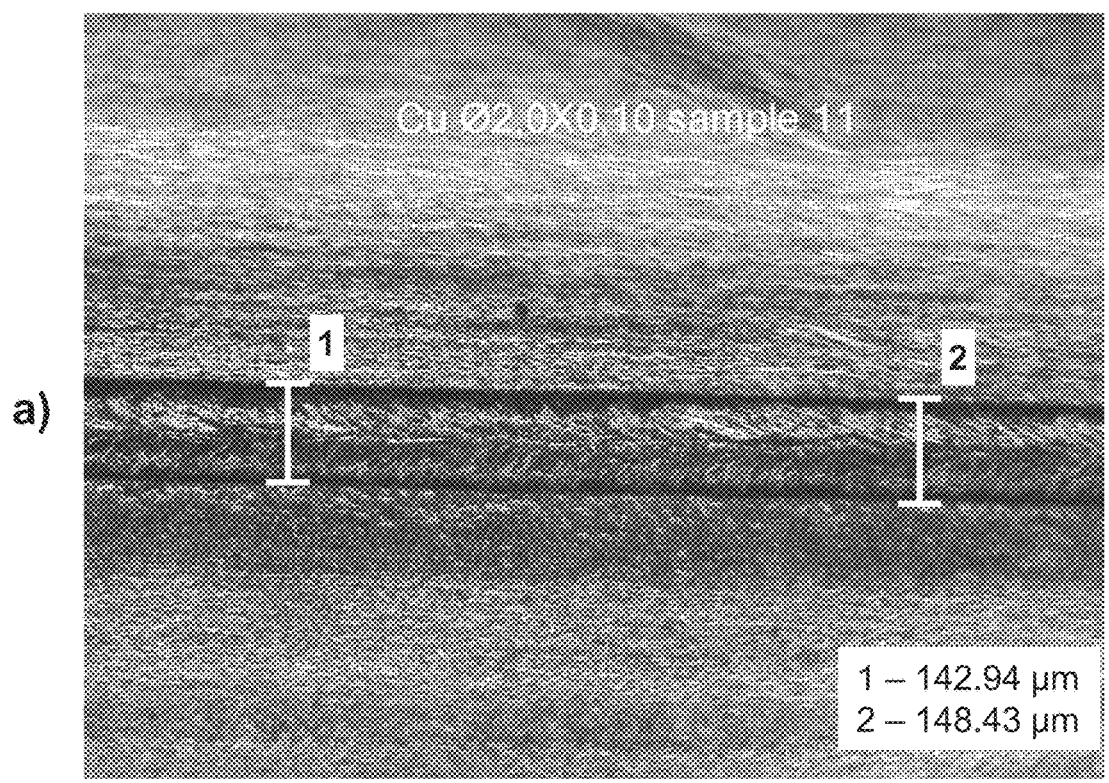
FIG. 3 shows images of a weld seam of a hollow profile produced in accordance with the method according to the invention.
Figure 3:
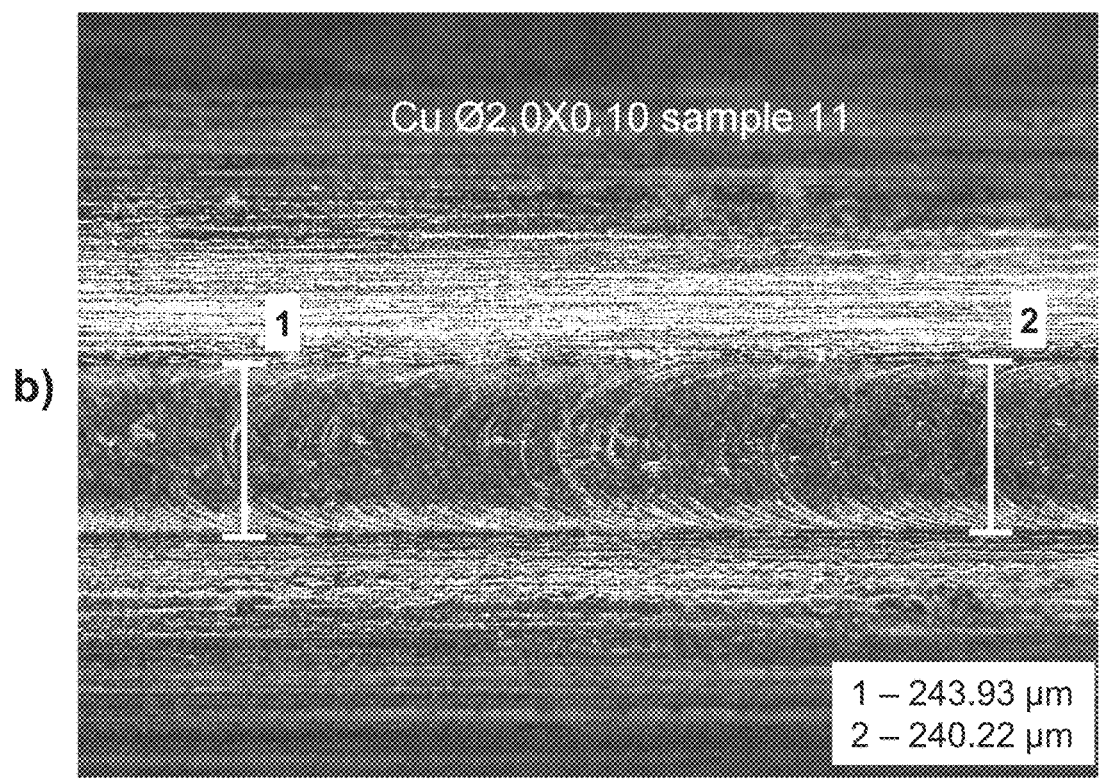

FIG. 3 shows images of a weld seam of a hollow profile produced in accordance with the method according to the invention. The hollow profile is a copper tube with a wall thickness of 0.1 mm, which has been deformed and welded from a copper strip in continuous fashion with a feed speed of 6 m/min. Here, the welding point was covered with argon. FIG. 3a) shows the weld seam on the inner side of the hollow profile, which has a width between 140 and 150 μm. FIG. 3b) shows an image of the outer side of the hollow profile, on which the weld seam has a width of approximately 242 μm. It can also be clearly seen that the weld seams both on the inside and on the outside are highly uniform, such that, for most applications, no reworking should be necessary.

Figure 4:
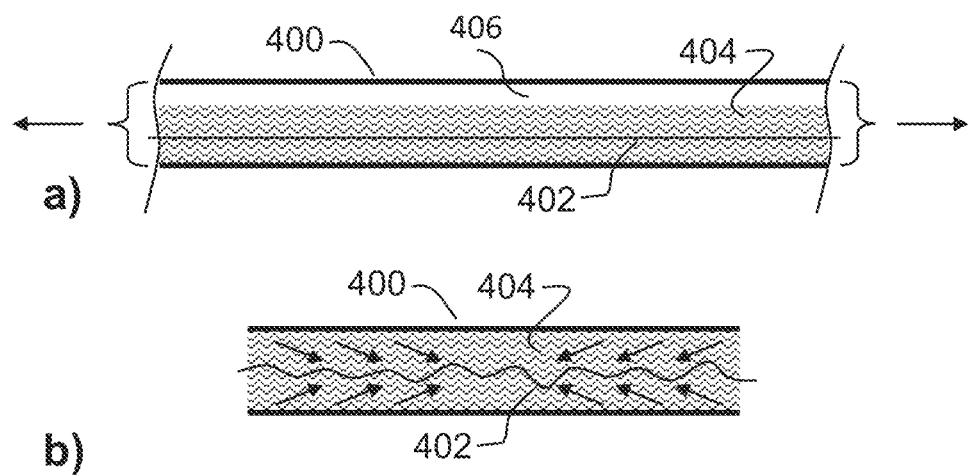
FIG. 4 is a simplified illustration of the mounting of a fibre waveguide in a filler gel in the interior of an elastically stretched hollow profile and of a hollow profile which is free from longitudinal stresses.

FIG. 4 is a highly simplified illustration of the mounting of a fibre waveguide 402 in a filler gel 404 in the interior of an elastically stretched hollow profile 400 and of a hollow profile 400 which is free from longitudinal stresses.

The illustrations in FIG. 4 are not to scale.

In FIG. 4a), a tensile stress is being exerted on the hollow profile 400, as indicated by the arrows pointing away from one another at the ends of the illustrated part, which tensile stress elastically stretches the hollow profile 400. It is assumed that the hollow profile 400 is only stretched in terms of length, and no change in diameter occurs. The hollow profile 400 has not been completely filled with the filler gel 404, but rather a free space 406 remains at the top side. The fibre waveguide 402 has been embedded in a stress-free state into the filler gel. Prior to the removal of the tensile stress, the temperature of the arrangement is lowered, such that the viscosity of the filler gel 404 increases. The increasing viscosity increases the friction between the inner side of the hollow profile 400 and the filler gel 404, and the friction between the filler gel 404 and the fibre waveguide 402.

In FIG. 4b), a tensile stress is no longer being exerted on the hollow profile 400. The increased viscosity of the filler gel 404 owing to the cooling has transmitted a part of the longitudinal shrinkage movement of the hollow profile 400 to the fibre waveguide 402, such that a force acting in the longitudinal direction of the fibre waveguide 402 acts, which force seeks to compress the fibre waveguide. The force is illustrated in the figure by the arrows pointing towards one another. The fibre waveguide 402 cannot absorb this force, but rather deflects in a lateral direction, resulting in buckled compression. As a result of the buckled compression, a greater length of the fibre waveguide 402 is mounted in the hollow profile per section of length of the hollow profile 400 than would correspond to the stress-free length of the hollow profile 400. Owing to the decrease of the volume, the filler gel 404 now completely fills the hollow profile 400. Here, the fibre waveguide 402 is free from stresses aside from relatively low bending moments, and can stretch again in the event of an expansion of the hollow profile 400, for example owing to warming.

| List of reference designations | | | |
|---|---|---|---|
| 1 | Metal strip | 100 | Method |
| 2 | Coil | 102 | Supply metal strip |
| 3 | Forming tool | 104 | Determine tensile force |
| 4 | Cutting unit | 106 | Trim edges |
| 5 | Measuring device | 108 | Form hollow profile |
| 6 | Guide elements | 110 | Weld |
| 7 | Drawing die | 110a | Determine temperature profile |
| 8 | Laser welding device | | |
| 9 | Fibre unwinder | 110b | Determine dimensions |
| 10 | Fibre guide | 111 | Supply fibre waveguides & |
| 11 | First measuring device | | filler gel |
| | | 112 | Draw off hollow profile |
| 12 | Guide/protective tube | 114 | Determine temperature |
| | | 116 | Lower temperature |
| 13 | Gel filling unit | 118 | Determine quality |
| 14 | Filling hose | 120 | Perform elastic stretching |
| 15 | Filling head | 121 | Monitor tensile force |
| 16 | Feed unit | 122 | Cool |
| 17 | Tube cooling means | 123 | Measure received length |
| 18 | Feed unit | 124 | Receive in receiving unit |
| 19 | Drawing die mounts | | |
| 20 | Draw-off capstan | 126 | Determine the excess length |
| 21 | Force measuring device | | |
| | | 128 | Record controlled variable(s) |
| 22 | Feed unit | | |
| 23 | Drawing die mounts | 130 | Determine manipulated variable(s) |
| 24 | Second measuring device | | |
| 25 | Winder | 200 | Device |

The invention claimed is:

1. A method for the continuous production of a thin-walled, radially closed metal hollow profile with fibre waveguides mounted therein, the length of which exceeds the length of the metal hollow profile surrounding them, said method comprising the steps of:

supplying a flat metal strip with a first supply speed to a deforming unit, continuously deforming the supplied flat metal strip to form a hollow profile with a slot running in a longitudinal direction, wherein two opposite edges of the metal strip are deformed to form the hollow profile lie flush against one another in a contact region extending in the longitudinal direction of the metal hollow profile, which edges are continuously welded to one another, wherein the edges for welding are led with the first supply speed past a welding region which is static in relation to a device which implements the method, and wherein a point in the welding region is heated by means of a laser, wherein, from a supply side of the metal hollow profile, one or more fibre waveguides from one or more fibre unwinders and a pre-warmed filler gel, the viscosity of which decreases with increasing temperature, are supplied such that, at the drawing-off side of the welding region, the one or more fibre waveguides lies or lie in the radially closed metal hollow profile in a manner embedded in the filler gel, wherein the supplied length of the fibres per unit of time is continuously determined, drawing off the welded metal hollow profile from the welding region, introducing a tensile force into the welded metal hollow profile by means of a draw-off capstan, wherein the metal hollow profile is elastically stretched and, in the stretched state, is led multiple times around the draw-off capstan, wherein the metal hollow profile and the filler gel cool further, wherein the tensile force acting on the metal hollow profile is monitored by means of a force measuring device, and wherein the elastic stretching of the metal hollow profile is eliminated when said metal hollow profile is supplied away from the draw-off capstan and to a receiving unit, measuring the length of the metal hollow profile that is led away from the draw-off capstan per unit of time, and receiving the metal hollow profile, with the fibre waveguide or fibre waveguides mounted therein, in the receiving unit, wherein a continuous determination of the ratios of length of the supplied fibre waveguide or of the supplied fibre waveguides and length of the metal hollow profile led away from the draw-off capstan, and a comparison with a specification value, are performed, wherein, furthermore, at least one controlled variable selected from a first list consisting of power of the laser, temperature of the filler gel, throughflow quantity of the filler gel per unit of time, tensile force exerted on the hollow profile and temperature of the hollow profile upstream of the draw-off capstan is recorded and, from this, for a continuous closed-loop control of the excess length of the fibre waveguide or of the fibre waveguides, at least one manipulated variable for a closed-loop control of a heater of a filler gel reservoir, and of a filling head is determined.

2. The method according to claim 1, wherein the supply of the one or more fibre waveguides comprises:
positioning a guide or protective tube in the metal hollow profile such that mutually spaced-apart openings of the guide or protective tube for the filler gel and for the one or more fibre waveguides are situated at the draw-off side of the welding region, wherein, within the protective tube, the one or more fibre waveguides and the filler gel are led past the welding region as viewed from the supply side.

3. The method according to claim 1, wherein the drawing-off of the welded hollow profile also followed by a drawing process by means of which the outer diameter of the metal hollow profile is reduced to a desired final dimension.

4. The method according to claim 1, wherein at least the welding region is flowed around or covered with an inert shielding gas.

5. The method according to claim 1, further comprising:
trimming one or two edges of the flat metal strip prior to the deformation.

6. The method according to claim 5, further comprising:
measuring the width of the trimmed metal strip before and/or measuring at least one dimension of the metal hollow profile after the welding, and
performing closed-loop control of the cutting width, and/or controlling the unit for performing the deformation, in a manner dependent on the measurement result and a specification value.

7. The method according to claim 1, further comprising:
measuring the temperature profile transversely and/or longitudinally with respect to the weld seam, and controlling the energy introduced into the welding region in a manner dependent on a comparison of the temperature profile with a specification profile, and/or performing closed-loop control of a cooling device, such that the temperature of the hollow profile does not fall below a predefined value.

8. The method according to claim 1, further comprising:
inspecting the weld seam by means of ultrasound, eddy current measurement, optical methods and/or x-rays.

9. The method according to claim 1, further comprising:
determining the tensile force on the flat metal strip and/or the welded metal hollow profile, and
performing closed-loop control of drives which supply the flat strip to the deformation and/or to the welding and/or of drives which draw off the welded hollow profile from the welding region and/or effect the elastic stretching.

10. A device for the continuous production of thin-walled, radially closed metal hollow profiles with one or more fibre waveguides mounted therein, the length of the one or more fibre waveguides exceeding the length of the radially closed metal hollow profiles the device comprising:
a supply unit configured for supplying a flat metal strip,
a deforming unit which deforms the flat metal strip to form the hollow profile around the supplied fibre waveguide such that the opposite edges of the flat metal strip abut flush against one another in a butt-jointed manner,
guide means between which the edges are held so as to lie flush against one another,
a welding device which welds together the edges lying flush against one another between the guide means, wherein the welding device comprises a laser which radiates light with energy which causes local melting of the metal of the metal strip to both sides of the edges abutting against one another,
a supply device with one or more fibre unwinders from which fibre waveguides are unwound and are introduced via a guide or protective tube through under the welding region into the welded metal hollow profile, wherein a first measuring device is provided which determines the length of the one or more fibre waveguides supplied per unit of time,
a gel filling unit from which, via an annular gap which is spaced apart from an outlet opening for the one or more fibre waveguides, a filler gel can be introduced into the welded metal hollow profile, wherein the viscosity of the filler gel decreases with increasing temperature, and wherein the gel filling unit has a heatable reservoir, a heatable filling hose and a heatable filling head and is configured for detecting a quantity of the filler gel supplied per unit of time,
a feed unit which conveys the welded metal hollow profile onwards,
a draw-off capstan, the tensile force of which on the metal hollow profile is monitored by means of a force measuring device,
a second measuring device for detecting a length of the metal hollow profile led away from the draw-off capstan per unit of time,
a receiving unit which receives the metal hollow profile with the fibre waveguide or fibre waveguides embedded therein, and
a control unit which is configured to continuously determine a present excess length of the one or more fibre waveguides from the measured values from the first and the second measuring device, wherein the control unit is furthermore configured to detect at least one controlled variable selected from a first list consisting of power of the laser, temperature of the filler gel, throughflow quantity of the filler gel per unit of time, tensile force exerted on the hollow profile by the draw-off capstan and temperature of the hollow profile upstream of the draw-off capstan and, on the basis of this, for a continuous closed-loop control of the excess length of the one or more fibre waveguides, determine at least one manipulated variable for a closed-loop control of the heater of the reservoir, of the filling hose, and of the filling head.

11. The device according to claim 10, further comprising a further feed unit and drawing dies or moulds for the reduction of the dimensions of the metal hollow profile after the welding.

12. The device according to claim 10, further comprising:
a measuring device which is arranged upstream of the deforming unit and which serves for ascertaining the tensile force acting on the supplied metal strip, wherein the control unit is configured to determine, from the ascertained tensile force, manipulated variables for an open-loop control of drives of the device.

13. The device according to claim 10, further comprising:
a cutting unit which is arranged upstream of the deformation unit and by means of which one or both edges of the supplied flat metal strip are trimmed, wherein it is sought for the width of the trimmed metal strip to correspond to the circumference of the hollow profile along the middle fibre of a bundle of fibre waveguides.

14. The device according to claim 13, furthermore comprising:
a device for receiving cutting residues.

15. The device according to claim 13, furthermore comprising:
a measuring device which is arranged downstream of the cutting unit and which serves for measuring the width of the cut-to-size flat metal strip.

16. The device according to claim 10, further comprising:
a measuring device for determining a temperature profile transversely and/or longitudinally with respect to the weld seam, wherein the measured temperature profile is supplied to the welding device for an open-loop control of the energy output and/or to the supply unit and/or to the feed unit for an open-loop control of the supply speed.

17. The device according to claim 10, further comprising:
a measuring device for measuring at least one dimension of the metal hollow profile after the welding.

18. The device according to claim 10, further comprising:
a measuring device for inspecting the weld seam and/or material defects or inhomogeneities of the material.

* * * * *